Aug. 24, 1943.  A. W. SHATTUCK, JR  2,327,933
PISTON RING EXPANDER
Filed April 1, 1938

Inventor
Arthur W. Shattuck Jr.
By
Attorney

Patented Aug. 24, 1943

2,327,933

UNITED STATES PATENT OFFICE 2,327,933

PISTON RING EXPANDER

Arthur W. Shattuck, Jr., Dallas, Tex., assignor to Koppers Company, Pittsburgh, Pa., a corporation of Delaware Application April 1, 1938, Serial No. 199,334

17 Claims. (Cl. 309—43)

This invention relates to new and useful improvements in piston ring expanders.

One object of the invention is to provide an improved expander for piston rings which is constructed so as to maintain the piston ring in proper working contact with the cylinder wall, whereby clearance between the piston and cylinder walls is compensated for and "piston slap" is eliminated.

An important object of the invention is to provide an improved expander which is insertable within the ring groove beneath the piston ring and which is constructed so as to contact the ring and piston at a maximum number of points with greater and more evenly distributed pressure than the usual expander now on the open market.

Another object of the invention is to provide an improved piston ring expander having increased limits of flexibility so as to be readily adaptable to pistons having different depth grooves; the construction being such that an even and uniform pressure is applied throughout the circumference of the ring regardless of the depth of the groove.

A further object of the invention is to provide an improved piston ring expander comprising a pair of spring members adapted to interlock with each other, whereby maximum contact with uniform pressure against the piston ring is produced.

A construction designed to carry out the invention will be hereinafter described, together with other features of the invention.

Figure 1:
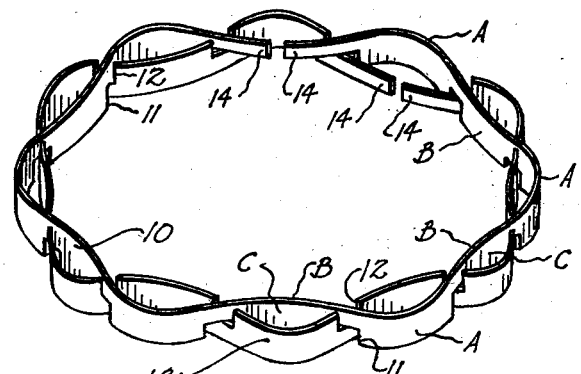
Figure 3:
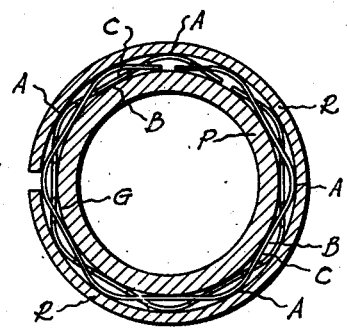
Figure 2:
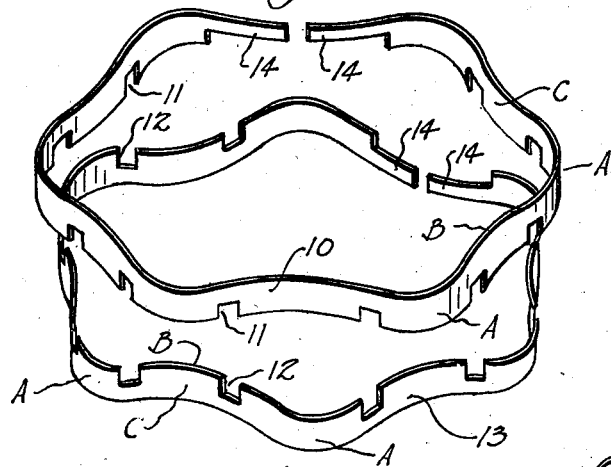
Figure 4:
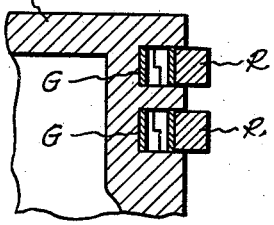
Figure 6:
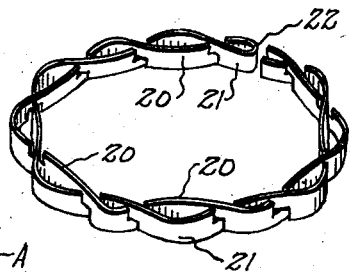
Figure 5:
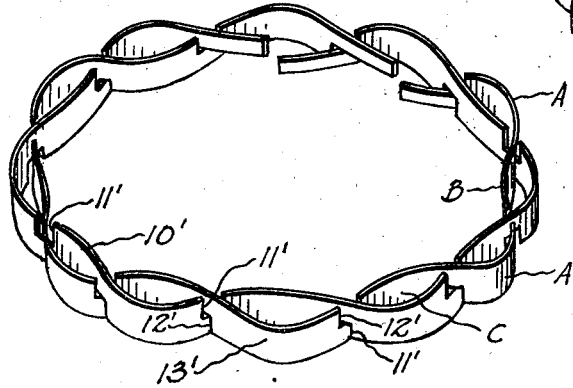

The invention will be more readily understood from a reading of the following specification and by reference to the accompanying drawing, in which an example of the invention is shown, and wherein:

Figure 1 is an isometric view of an expander, constructed in accordance with the invention, Figure 2 is a similar view, showing the rings of the expander separated, Figure 3 is a horizontal, cross-sectional view, taken through a piston and ring having the expander in position behind said ring, Figure 4 is an enlarged vertical, sectional view, of the upper portion of the piston, showing the expander within the piston ring groove, Figure 5 is a modified form of the invention, and Figure 6 is an isometric view of still another form of the invention.

In the drawing, the numeral 10 designates an annular member or ring, which is preferably formed from a ribbon of steel, or other metal, whereby it has an inherent resiliency or flexibility. The ring is split so as to facilitate its insertion within the piston ring groove G of a piston P, as will be explained. The ring is of a general undulating shape, in plan, having a plurality of curves between its extremities, whereby a plurality of alternate piston ring and piston bearing surfaces A and B are provided. As is clearly shown in Figures 1 and 3, each bearing surface A, which contacts the piston ring R, is rounded and all of said surfaces have substantially the same radii.

Each connecting portion C between the surfaces A is in the form of a long spring arch and the high point of this arch forms one of the bearing surfaces B, which engage the piston. All of the connecting portions C have substantially the same radii, whereby the curvature of the bearing surfaces is substantially the same and also whereby the bearing surfaces A are spaced equidistant from each other, and the surfaces B are also spaced equidistant from each other throughout the length of the member. The radius of each connecting portion C is considerably greater than the radius of each bearing surface A, whereby an equal pressure on the surfaces A and B will tend to flatten the connecting portion and curved surface B before the curved surfaces A are flattened. In other words, due to the longer arc or radius of each connecting portion or bearing surface B, a greater flexibility is present in this portion.

A plurality of notches or recesses 11 are formed in the lower edge portion of the member or ring and these notches are located one on each side of each curved bearing surface A, being cut in the connecting portions C. These notches are arranged to coact with notches 12 formed in the upper edge portion of a second annular ring or member 13 which is constructed in exactly the same manner as the ring 10. The rings 10 and 13 are of the same width and contour and the notches 11 and 12 are of such depth that when the rings are interlocked, as shown in Figure 1, the curved bearing surfaces A of the ring 10 are disposed opposite the bearing surfaces B of the ring 13. The notches have a width greater than the thickness of the rings so as to permit a limited lateral movement of the rings with relation to each other.

In using the device, the rings 10 and 13 are interconnected by engaging the notches 11 of the upper ring 10 with the notches 12 of the lower ring 13 (Figure 1). It is preferable that the ends of the rings are disposed near vertical alinement with each other and said ends may be reduced, as shown at 14 so as to permit a simultaneous spreading of the rings, whereby said rings may be readily engaged around the piston P and inserted into the ring groove G thereof (Figure 3). After the expander is within the groove, the usual split piston ring R is inserted in the groove and its inner surface engages said expander to confine the same between the bottom of the groove and said ring.

With the piston ring R in position within the groove, the inner surface thereof is engaged by the curved bearing surfaces A of the interconnected members or rings 10 and 13, while the bottom of the groove G is engaged by the bearing surfaces B of said rings. The application of pressure to the rings 10 and 13 causes the connecting portions C and rounded bearing surfaces B to be flattened out, as shown in Figure 3, with the result that the bearing surfaces A, engaging the piston ring R, are caused to exert an outward pressure on said ring. This flattening or straightening of the portions C places the same under tension and is permitted because of the size of the notches 11 and 12, which allow movement of the rings with relation to each other. The length of the connecting portions C gives them increased flexibility so that the expander may be used in grooves of different depths, while sufficient pressure at the points A may be maintained. By employing the two interconnected rings, the spring arches between the bearing surfaces A may be lengthened so as to increase flexibility without reducing the number of the total points of contact with the piston ring R. In fact, the number of contact points is increased with the result that a more uniform pressure around the circumference of the ring is produced. This maintains the outer surface of the ring R in engagement or contact with the cylinder wall irrespective of the unevenness of wear. The greater distance between contact surfaces A of each ring also reduces overheating of the ring since sufficient space for a lubricant is provided between said surfaces. Further, the life of the expander is greatly increased since two members, instead of one, are carrying the load and spring fatigue is not as apt to occur in a short time, as is the case where one member is used.

In Figure 5, a modified form of the invention is shown, wherein interlocking rings 10' and 13' are provided. The rings are constructed in substantially the same manner as the rings 10 and 13 with the exception of the positioning of the notches. In the ring 10', notches 11' are formed alternately in the upper and lower edge portions of the ring 10', while similar notches 12' are formed alternately in the upper and lower edges of the ring 13'. With this arrangement, the rings are interconnected by entwining the rings with each other, whereby vertical displacement of one, with relation to the other, is prevented. The operation of this form is exactly the same as the first form. Although the members 10 and 13, as well as the members 10' and 13', have been shown and described as being separately interlocked, it would be possible to weld, or otherwise fasten the same together.

In Figure 6, still another form of the invention is shown, wherein a ring or member 20, similar to 10', is adapted to be entwined or interlocked with a member 21, similar in construction to the member 13'. The members 20 and 21 are made integral with each other, that is, said members are formed of one continuous piece or section of material. In making this form, one of the members is formed by properly shaping the material and when the first member is completed, the material is bent upon itself, as shown at 22, after which the second ring is formed. This places the ends or extremities of the section of material of which the members are formed adjacent each other and these ends are spaced from the point 22, whereby both members may be simultaneously inserted in the piston ring groove G by merely spreading said members.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A piston ring expander adapted to be interposed between the piston ring and bottom of the ring groove of a piston including, a pair of flexible split rings of flat ribbon-like material, each having curved portions forming bearing surfaces to engage the piston ring, said surfaces being connected by an elongate curved arch which has its high point forming a bearing surface for engaging the bottom of the groove, the rings having means in their edge portions for interconnecting said rings so that they may lie in the same ring groove with the curved piston ring bearing surfaces of one ring disposed opposite the groove bearing surfaces of the other ring.

2. A piston ring expander adapted to be interposed between the piston ring and bottom of the ring groove of a piston including, a pair of flexible split rings of flat ribbon-like material, each having curved portions forming bearing surfaces to engage the piston ring, said surfaces being connected by an elongate curved arch which has its high point forming a bearing surface for engaging the bottom of the groove, said rings having notches in their edge portions for interconnecting the rings so that said rings will lie in the same ring groove and are readily insertable in said ring groove.

3. A piston ring expander adapted to be interposed between the piston ring and bottom of the ring groove of a piston including, a pair of flexible split rings of flat ribbon-like material, each having curved portions forming bearing surfaces to engage the piston ring, said surfaces being connected by an elongate curved arch which has its high point forming a bearing surface for engaging the bottom of the groove, said rings having notches in their edge portions for interconnecting the rings so that said rings will lie in the same ring groove and are readily insertable in said ring groove, the notches being located so that when the rings are interconnected, the curved bearing surfaces of one ring which engage the piston ring are radially alined and spaced from the bearing surfaces of the other ring which engage the bottom of the groove.

4. A piston ring expander adapted to be interposed between the piston ring and bottom of the ring groove of a piston including, a pair of flexible split rings of flat ribbon-like material, each ring having a general undulating shape which forms a plurality of curved bearing surfaces for engaging the inner side of the piston ring and a plurality of curved bearing surfaces located between the first-named surfaces for engaging the groove bottom, one of the rings having notches in its lower edge portion while the other ring has coacting notches in its upper edge portion whereby the rings may be interconnected.

5. A piston ring expander adapted to be interposed between the piston ring and bottom of the ring groove of a piston including, a pair of flexible split rings, each ring having a general undulating shape which forms a plurality of curved bearing surfaces for engaging the inner side of the piston ring and a plurality of curved bearing surfaces located between the first-named surfaces for engaging the groove bottom, each ring also having notches disposed alternately in its upper and lower edge portions, whereby the rings may be interlocked so as to lie in the same ring groove.

6. As a sub-combination in a piston ring expander, a split flexible ring of flat ribbon-like material having a general undulating shape to provide outer curved bearing surfaces and inner curved bearing surfaces, the latter having greater radii than the former, and means on the ring for connecting the same to an identical ring.

7. As a sub-combination in a piston ring expander, a split flexible ring of flat ribbon-like material having a general undulating shape to provide outer curved bearing surfaces and inner curved bearing surfaces, the latter having greater radii than the former, said ring having notches in its edge portion so that it may be interconnected with an identical ring.

8. A piston ring expander adapted to be interposed between the piston ring and bottom of the ring groove of a piston including, a pair of flexible split rings of flat ribbon-like material, each having curved portions forming bearing surfaces to engage the piston ring, said surfaces being connected by an elongate curved arch which has its high point forming a bearing surface for engaging the bottom of the groove, said rings being so constructed and arranged that they may be interconnected with the curved piston ring bearing surfaces of one ring disposed opposite the curved groove bearing surfaces of the other ring.

9. A piston ring expander adapted to be interposed between the piston ring and bottom of the ring groove of a piston including, annular spring members of flat ribbon-like material connected to each other at one of their extremities and having means in their edge portions so that they may be interconnected, each member being of a general undulating shape to provide a plurality of contact surfaces for engaging said piston ring and groove bottom, the contact surfaces of one member which engage the piston ring being radially alined and spaced from the contact surfaces of the other members which engage the bottom of the groove when said members are interconnected.

10. A piston ring expander adapted to be interposed between the piston ring and bottom of the ring groove of a piston including, a pair of annular spring members of flat ribbon-like material made integral with each other and having means in their edge portions so that they may be interconnected, each member being of a general undulating shape to provide a plurality of contact surfaces for engaging said piston ring and groove bottom, the contact surfaces of one member which engage the piston ring being radially alined and spaced from the contact surfaces of the other member which engage the bottom of the groove when said members are interconnected.

11. A piston ring expander adapted to be interposed between the piston ring and bottom of the ring groove of a piston including, annular spring members of flat ribbon-like material coacting with each other, each having a general undulating shape to provide contact surfaces for said piston ring and groove bottom, the members having means for accomplishing interconnection thereof so that the piston ring contacting surfaces of one member are disposed opposite the groove contacting surfaces of the other member.

12. A piston ring expander adapted to be interposed between the piston ring and bottom of the ring groove of a piston including, a pair of annular spring members of flat ribbon-like material having means for accomplishing interconnection thereof, each member being of a general undulating shape to provide contact surfaces for engaging said piston ring and groove bottom, the contact surfaces of one member which engage the piston ring being radially alined and spaced from the contact surfaces of the other member which engage the bottom of the groove.

13. A piston ring expander adapted to be interposed between the piston ring and bottom of the ring groove of a piston including, annular spring members connected to each other at one of their extremities, each member being of a general undulating shape to provide a plurality of contact surfaces for engaging said piston ring and groove bottom, each member also having notches disposed alternately in its upper and lower edge portions, whereby said members may be interlocked so as to lie in the same ring groove.

14. As a sub-combination in a piston ring expander, a split flexible ring having a general undulating shape to provide outer curved bearing surfaces and inner curved bearing surfaces, the latter having greater radii than the former, said ring having notches disposed alternately in its upper and lower edge portions, whereby said ring may be interlocked with an identical ring.

15. An expander structure adapted to be mounted in a circular groove behind a sealing element such as a piston ring to project such sealing element from said groove, said structure comprising at least two ribbon-like crimped spring elements, each of said elements subtending arcs less than 360°, and being so positioned that the crimps of one element are staggered in relation to those of the other whereby a multiplicity of points of contact are secured between said elements and the proximate face of the ring with which it coacts.

16. An expander structure adapted to be mounted in a circular groove behind a sealing element such as a piston ring to project such sealing element from said groove, said structure comprising at least two ribbon-like crimped spring elements, each of said elements subtending arcs less than 360°, and being so positioned that the crimps of one element are staggered in relation to those of the other whereby a multiplicity of points of contact are secured between said elements and the proximate face of the ring with which its coacts; and means comprising a part of the structure of said crimped elements for preventing rotation of either of the elements relatively to the other.

17. A ring expander formed of sinuously curved ribbon material and including, a plurality of rings positioned edge to edge and in engagement with each other at spaced points throughout their lengths, said expander being formed and arranged so that the sinuous curves of adjacent rings of said expander are out of registry with each other.

ARTHUR W. SHATTUCK, Jr.